June 21, 1938.  A. E. MEINKE  2,121,254
LOCKING DIFFERENTIAL
Filed June 1, 1937  2 Sheets-Sheet 1
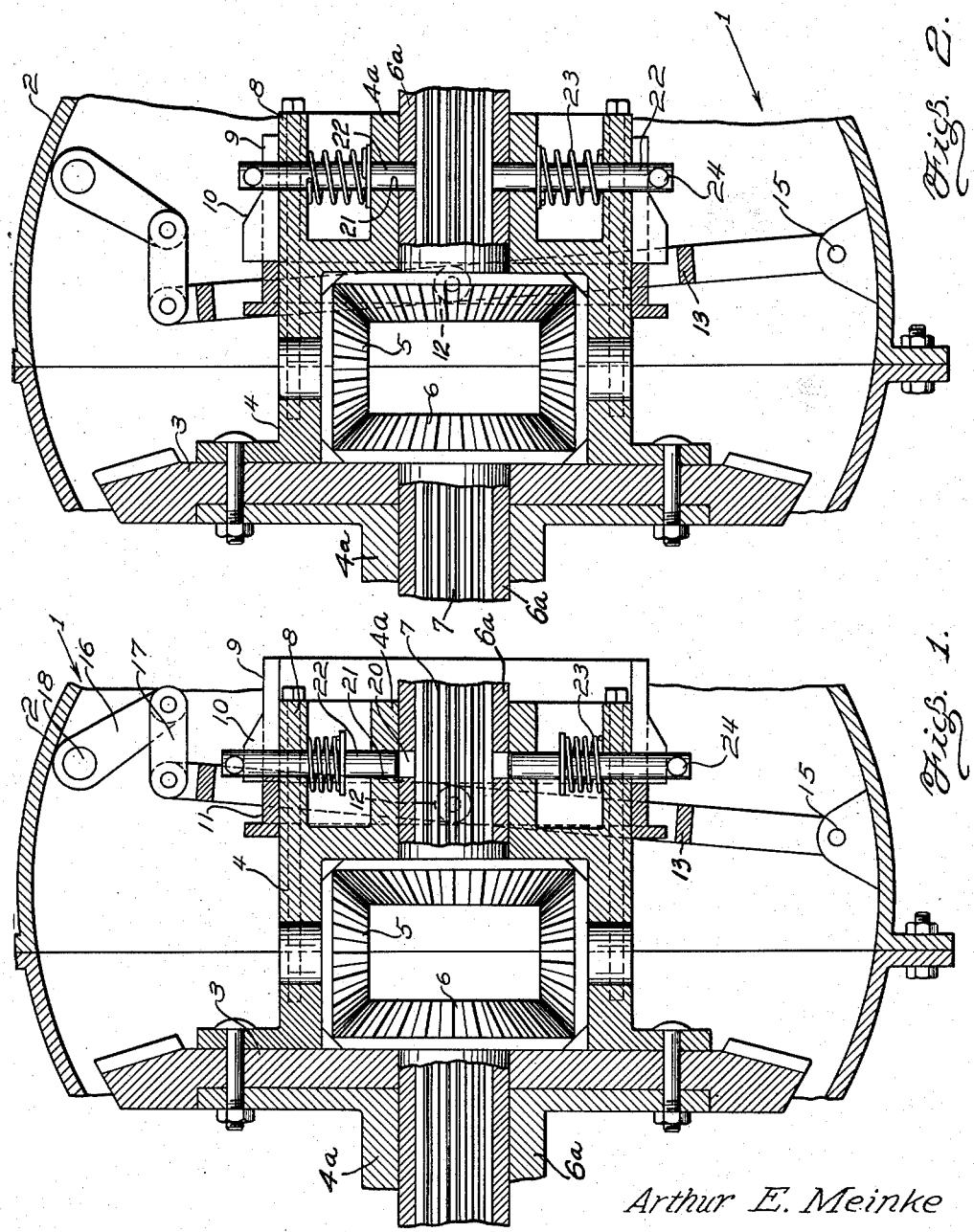
Arthur E. Meinke
INVENTOR
BY Victor J. Evans & Co.
ATTORNEYS June 21, 1938.  A. E. MEINKE  2,121,254
LOCKING DIFFERENTIAL
Filed June 1, 1937  2 Sheets-Sheet 2
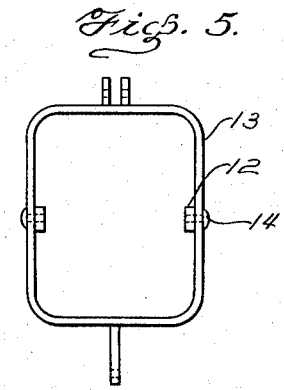
Fig. 5.
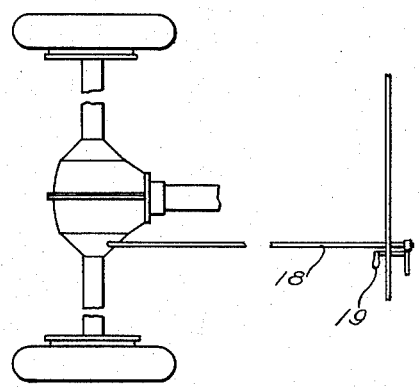
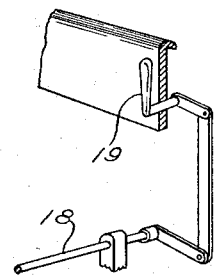
Fig. 4.
Fig. 6.
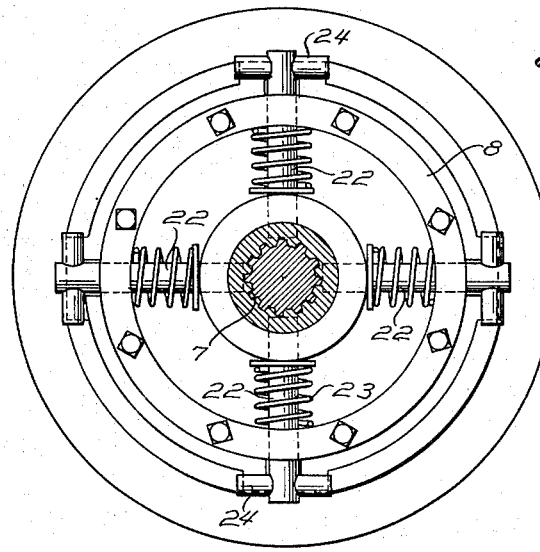
Fig. 3.
Arthur E. Meinke
INVENTOR
BY Victor J. Evans & Co.
ATTORNEYS Patented June 21, 1938

2,121,254

UNITED STATES PATENT OFFICE 2,121,254

LOCKING DIFFERENTIAL

Arthur E. Meinke, Minneapolis, Minn.

Application June 1, 1937, Serial No. 145,868

7 Claims. (Cl. 74—316)

This invention relates to differentials and more particularly to a locking device therefor and has for the primary object the provision of a device of this character which will permit an operator of a motor vehicle to lock or render the differential action of the differential of said vehicle inoperative, should one of the drive wheels lose traction and the vehicle become stalled so that each drive wheel will receive power and thereby permit the stalled vehicle to readily extract itself under its own power.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary vertical sectional view illustrating a differential for a motor vehicle equipped with a locking device constructed in accordance with my invention and showing the differential free to have its differential action.

Figure 2 is a view similar to Figure 1 showing the differential action locked or rendered inoperative.

Figure 3 is a transverse sectional view showing the locking pins for rendering the differential action inoperative.

Figure 4 is a fragmentary plan view, partly in section, showing the hand control for the locking device.

Figure 5 is a side elevation illustrating a shifting fork; and

Figure 6 is a fragmentary perspective view showing the control means for the shifting fork.

Referring in detail to the drawings, the numeral 1 indicates a conventional type of differential employed on motor vehicles and which includes a housing 2, a ring gear 3 having secured thereto a spider cage 4 carrying the usual spider gears 5 which mesh with axle gears 6, the reduced diameter bearing hubs of which are splined on axles 7 which may be assumed to be journaled in the housing 2 in the conventional manner. The hubs 6a of the axle gears are embraced by and journaled in bearing sleeves 4a of the spider cage. The ring gear 3 is mounted fast on the spider cage. The foregoing description describes briefly a conventional type of differential and to which my invention is adapted.

In adapting this invention to the differential, the spider cage 4 has formed integrally therewith an annular bearing 8 provided with openings and slidably supports a slotted sleeve 9 provided with pairs of cams 10. The sleeve 9 has formed therein an annular groove 11 to be engaged by fork connecting elements 12 pivoted on a fork 13, as shown at 14. The fork is pivotally mounted on the housing 2, as shown at 15, and is connected to an arm 16 by a link 17. The arm is secured on a shaft 18 journaled in the housing 2 and to which a hand control 19 is connected. The hand control may be of any desired construction and extends into convenient reach of the operator of the motor vehicle so that said fork may be rocked on its pivot for the purpose of shifting the position of the sleeve 9 on the bearing 8.

One of the axle gears in the hub 6a thereof is provided with openings 20 aligning with openings 21 formed in the overlying bearing sleeve 4a of the spider cage 4. The openings 20 and 21 align with the openings in the bearing 8. Slidable in the openings of the bearing 8 and the openings 20 and 21 are radial locking pins 22 urged in the direction of the openings 20 by coil springs 23. The pins 22 carry heads 24 to ride onto and off of the cams 10 in accordance with the position of the sleeve 9. The heads when in engagement with the cams hold the pins out of the openings 20 permitting the differential to have its usual differential action. However, when the heads are disengaged from the cams the pins enter the openings 20 and lock one of the axle gears and thereby destroy the differential action so that the power will be delivered equally onto both axles.

What is claimed is:

1. In combination with a differential including a spider cage carrying spider gears meshing with axle gears and the hub of one of the latter-named gears having openings, locking pins slidably mounted in said cage, springs acting on said pins to urge them into the openings of one of the axle gears, a slotted sleeve slidable on the cage and having the pins extending therethrough, cams carried by said sleeve to engage the pins for disengaging the pins from the openings to permit the differential to have a differential action, and an operating means connected with said sleeve.

2. In combination with a differential including a spider cage carrying spider gears meshing with axle gears and the hub of one of the latter-named gears having openings, locking pins slidably mounted in said cage, springs acting on said pins to urge them into the openings of one of the axle gears, a slotted sleeve slidable on the cage and having the pins extending therethrough and provided with a groove, cams carried by said sleeve to engage the pins for disengaging the pins from the openings to permit the differential to have a differential action, a pivotally mounted fork engageable with the groove of the sleeve, and an operating means connected to said fork.

3. In combination with a differential including a spider cage carrying spider gears meshing with axle gears, the hub of one of said last named gears having openings, locking pins slidably mounted in said cage, and means for selectively extending the pins into the hub openings to lock the differential against differential action or withdrawing the pins from said openings to permit differential action, said last named means including a slotted sleeve slidable on the cage and having the pins extended through the slots therein, and cam elements carried by said sleeve and slidably engaging said pins.

4. In combination with a differential including a spider cage carrying spider gears meshing with axle gears, the hub of one of the latter-named gears having openings, locking pins slidably mounted in said cage, and means for selectively extending said pins into the hub openings to lock the differential against differential action or withdrawing the pins from the hub openings to permit differential action, said last-named means including a slotted sleeve slidable on the cage and having the pins extending through the slots therein, cam elements carried by the sleeve and slidably engaging the pins, a pivotally mounted fork intermediately engaging the groove of the sleeve, and an operating means connected to said fork.

5. The combination with a differential including a spider cage provided with axially spaced bearings, axle gears having reduced diameter bearing hubs working through and journaled in said bearings, one of said reduced diameter axle gear hubs being provided with an external recess within and exposed to its surrounding bearing, a radial opening in the last said bearing for alignment with its gear hub recess under rotation of the parts one with respect to the other, a locking pin slidably carried by said cage and working radially through and being closely embraced by said bearing recess for projection into locking engagement with said gear hub recess, and means for selectively extending and retracting said locking pin.

6. In a differential, the combination with axially spaced driven members each adapted for connection to an opposite axle shaft section and having a reduced diameter hub, a cage-acting member having bearing sleeves closely embracing said driven member hubs, means for imparting rotary motion to said cage-acting member, and differential mechanism contained in said cage-acting member and operatively connecting the same to the axially spaced driven members for differential driving action thereon, of at least one external recess in the hub of one of the driven members exposed to the bearing sleeve therefore, at least one locking pin carried by the cage and working radially slidably through but being closely embraced by said last named bearing sleeve for interlocking engagement with said hub recess, and operating means for actuating said pin to project the same into the said hub recess to lock the differential against differential action and withdrawing the pin from the hub recess to permit free differential action.

7. The structure defined in claim 6 in which said operating means includes a sleeve slidably mounted on said cage-acting member and provided with slots through which said lock pin extends, and cooperating cam surfaces on said sleeve and locking pin.

ARTHUR E. MEINKE.